June 19, 1962 W. W. GAERTNER ETAL 3,040,188

THREE ZONE NEGATIVE RESISTANCE JUNCTION DIODE
HAVING A SHORT CIRCUIT ACROSS
ONE OF THE JUNCTIONS
Filed Oct. 28, 1960

*INVENTORS,*
WOLFGANG W. GAERTNER
MAX SCHULLER
*BY* Jack H. Linscott
ATTORNEY

United States Patent Office 3,040,188
Patented June 19, 1962

3,040,188

THREE ZONE NEGATIVE RESISTANCE JUNCTION DIODE HAVING A SHORT CIRCUIT ACROSS ONE OF THE JUNCTIONS

Wolfgang W. Gaertner and Max Y. Schuller, Fairfield County, Conn., assignors to the United States of America as represented by the Secretary of the Army
Filed Oct. 28, 1960, Ser. No. 65,865
1 Claim. (Cl. 307—88.5)
(Granted under Title 35, U.S. Code (1952), sec. 266)

The invention described herein may be manufactured and used by or for the Government for governmental purposes without the payment of any royalty thereon.

This invention relates to semiconductive translating devices which provide negative power dissipation to alternating signals. More specifically, it relates to improved two-terminal semiconductive elements of this general kind.

Hitherto, various arrangements have been suggested for operation of semiconductive devices as negative resistances. For obvious reasons, such as circuit and structural simplicity, it is preferable to utilize in such arrangements two-terminal or diode elements. There have been suggested, hitherto, arrangements which operate a semiconductive diode to provide negative resistance to alternating signals, but such arrangements have generally involved specific relationships between the frequency of the alternating signal to which negative resistance is exhibited and transit time characteristics of the flow of charge carriers in the semiconductive bodies. As a result, such arrangements are generally limited to operation over a relatively narrow frequency band and so are of limited applicability.

It is an object of the invention to achieve a negative resistance effect in semiconductive devices which are relatively independent of frequency.

In one embodiment of the invention to be described, the semiconductor body comprises a pair of P-type end zones and an intermediate N-type zone. The intermediate zone is electrically connected to one of the end zones thus short-circuiting the P-N transition, and terminal connections are attached to the two end zones. By means of a voltage applied across the two end zones of a proper polarity, the shorted junction becomes forward biased whereas the un-shorted junction is reversed biased. When the un-shorted junction is biased to a field strength beyond that characteristic of avalanche breakdown, a negative resistance to the applied signal is seen across the two-terminal connections. As a result, a portion of the voltage-circuit characteristic of such a diode body exhibits a negative resistance effect which can be used either in a generator of oscillations, in an amplifier or in switching elements.

Figure 1:
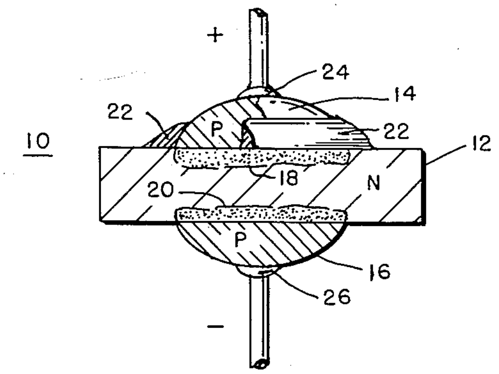
Figure 2:
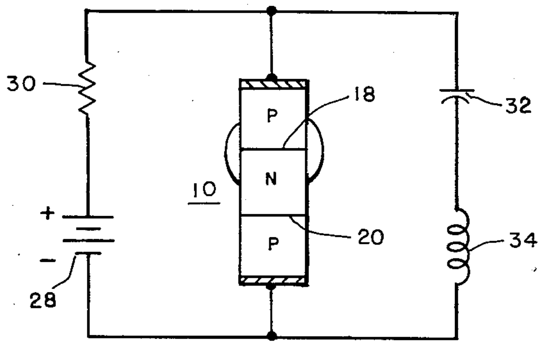

For a more detailed description of the invention, together with other and further objects thereof, reference is had to the following description taken in connection with the accompanying drawing, in which similar numerals designate similar elements and wherein:

FIG. 1 is a cross-sectional view of a semiconductive translating unit of the kind which is utilized to achieve negative resistance in accordance with the invention; and FIG. 2 shows an oscillator which utilizes a unit of the kind shown in FIG. 1 in accordance with the invention.

Referring to FIG. 1, a semiconductor device 10, specifically a typical PNP transistor, is modified according to the principles of the invention. It is to be understood that the principles of the invention wherever described with reference to a PNP transistor may be similarly applied to an NPN transistor. The device 10 comprises an intermediate body 12 of N-type germanium or silicon or the like, preferably germanium, having two P-type conductivity end regions 14 and 16. The P-type regions 14 and 16 are separated from the remainder of the body 12 by rectifying barriers 18 and 20 respectively. The P-type regions 14 and 16 and rectifying barriers 18 and 20 may be formed in a conventional manner by alloying small portions of a trivalent impurity metal, such as indium, capable of imparting P-type conductivity characteristics to the germanium, into opposite surfaces of the germanium body 12. P-type region 14 is connected to body 12 by a highly conductive coating such as silver paint 22, or by other convenient means. This causes a short-circuit of the P-N transistion or junction 18. Ohmic connections 24 and 26 are made to the terminal zones 14 and 16, respectively, by means of which a voltage may be applied to device 10, of the polarity shown, to bias in the reverse direction the barrier 20 formed by the N-type body 12 and P-type region 16.

An NPN device may be made in a similar manner by using a body 12 of P-type germanium and alloying a pentavalent impurity, such as antimony therein. In such case, the polarity to bias junction 20 in the reverse direction, would be opposite to that shown in FIG. 1.

As has been indicated above, there are various possible applications of negative resistance diodes in accordance with the invention. The oscillator shown in FIG. 2, comprises a semiconductor diode 10, of the kind described, having electrode ohmic connections to the terminal zones by means of which diode 10 is connected in series with a direct current voltage source 28 and a load resistance 30. A series resonant circuit consisting of capacitance 32 and inductor 34 is connected in shunt across diode 10. The polarity of the source 28 is such as to result in a forward bias at junction 18 and a reverse bias in junction 20 of diode 10. The magnitude of source 28 is sufficient to provide the field strength across junction 20 necessary for breakdown. The value of resistance 30 is chosen so that the external resistance seen by diode 10 matches the net negative resistance provided by the diode. The value of capacitance 32 and inductor 34 are chosen in accordance with the frequency of operation desired. The highest frequency attainable will be limited by the capacity of diode 10 itself and the frequency characteristic of the L-C combination. However, the transit time of holes and electrons across the diode 10 are so short as to make possible very high frequency oscillations.

While there has been described what is at present considered a preferred embodiment of the invention, it will be obvious to those skilled in the art that various changes and modifications may be made therein without departing from the invention, and it is therefore aimed in the appended claim to cover all such changes and modification as fall within the spirit and scope of the invention.

What is claimed is:

A semiconductor translating device for providing negative resistance to an alternating signal comprising a semiconductive body including two end zones of the same conductivity type and intermediate therebetween a zone of the opposite conductivity type for providing a pair of rectifying junctions between said contiguous zones, a terminal connection to each of said end zones, one of said end zones and said intermediate zone being electrically connected by a conductive coating of metallic paint and short-circuiting one of said rectifying junctions, the other of said junctions being un-shorted, means defining a circuit path between the two terminal connections including a load and voltage supply means applied in such a direction that said un-shorted junction becomes reverse biased, and said voltage supply means establishing in said semiconductive body a substantially uniform electric field of sufficient magnitude whereby a negative resistance is developed across the two terminal connections.

References Cited in the file of this patent

UNITED STATES PATENTS 2,962,605 Grosvalet -------------- Nov. 29, 1960